United States Patent Office 2,901,061
Patented Aug. 25, 1959

2,901,061

METHOD OF RECOVERING CHEMICAL MISTS FROM GASES

Rufus G. Hartig, Park Forest, Ill., and James R. Archer, East Point, Ga., assignors to International Minerals & Chemical Corporation, a corporation of New York No Drawing. Application November 30, 1954
Serial No. 472,212

6 Claims. (Cl. 183—115)

This invention relates to a method for complete removal of difficultly recovered but valuable gaseous components from gaseous mediums. More particularly it relates to the recovery of gaseous material normally escaping in waste gases of chemical plants as so-called chemical mists passed by gas absorber systems. Still more particularly, it relates to the recovery of such gaseous components of such gaseous mediums as sulfur trioxide, phosphorus pentoxide, halides and the like.

In the manufacture of acids and chemicals, gases are produced which, if they escape into the atmosphere, are corrosive towards construction materials, destructive of vegetation and injurious to the health of humans and animals. The gases in general are trapped in absorbers where a reactive medium such as sodium hydroxide or a nonreactive medium, i.e., an absorption medium, contacts the gases and removes the major portions of the objectionable components therefrom. The absorber system for removal of these gases consists generally of a chamber for bubbling the gases through the liquids or towers filled with inert packing and flowing therethrough.

Inability of such absorber systems to absorb certain quantities of objectionable material escaping as a waste mist from these plants has given impetus to the use of secondary equipment such as Cottrell precipitators, Pease-Anthony scrubbers, and the like. While such expensive equipment minimizes the quantity of objectionable gas escaping during normal plant operation, they do not entirely eliminate this nuisance. In addition, under stress of abnormal operations such as at start-up times or during fluctuations in capacity, the equipment does not even prevent mists from escaping in such quantities as to become major nuisances.

It is a primary object of this invention to overcome these disadvantages and shortcomings of processes heretofore in use.

It is a further object of this invention to recover greater quantities of useful components from gaseous mediums.

It is still another object of this invention to provide a method of completely eliminating escape of obnoxious chemical mists.

It still another object of this invention to provide a method capable of such flexibility that it can provide complete absorption of chemical mists over the full range of operating conditions of the plants.

It is still onother object of this invention to provide a method for absorbing gases and prevent escape of a chemical mist such as sulfur trioxide, halides, hydrochloric acid, phosphorus pentoxide, phosphoric acid, and the like.

These and other objects of the invention will be apparent to those skilled in the art from the following description.

Reference to the manufacture of sulfuric acid serves to highlight the problem and the invention of applicant. In the manufacture of sulfuric acid by the contact process, a mixture of sulfur dioxide and oxygen containing gases is passed over a catalyst, preferably of the vanadium type, at temperatures of about 300° C. to about 500° C. in order to convert, i.e. oxidize, the sulfur dioxide to sulfur trioxide. Generally the gases issuing from the converter are cooled to temperatures of the order of 50° C. to 200° C. Sulfur trioxide is removed from the cooled gases by passage through absorbers where the gases contact strong sulfuric acid solution. Mist resulting from the contact of the above described gas and water cannot be absorbed by conventional absorbers.

Waste gases from the water contacting step which escape to the atmosphere show a sulfur trioxide content of varying amounts depending on water concentration. This sulfur trioxide and water content in the atmosphere is one of the so-called chemical mists which create nuisances in the industrial areas.

Now it has been discovered that the chemical mists such as sulfur trioxide discussed above can be eliminated by passage of mist-bearing gas through a packing of inert materials having a critical interstitial pore size, which can be controlled within limits through control of the volume of liquid used to wet the packing.

In utilizing the principle herein referred to, the mists and gases are passed through a confined space such as a tower. This confined space is filled in its entirety or in part, depending upon use conditions, with a packing inert with respect to the gases and mists such as Orlon filaments or woven Orlon cloth, asbestos, sawdust, coke, rock, ceramic material, and the like. When using cloth or filaments and asbestos, interstitial space must be provided so as to be equivalent to that provided by a size graded bed of coke, rock, sawdust, ceramic material, or the like, having particles of a size to pass through standard screens in the range between about 10 mesh, 1650 microns, and about 80 mesh, 175 microns (Tyler Standard screens).

Packing in the confined space may be wetted with liquid which is capable of absorbing the nuisance gases, i.e., water, diltue acids, aqueous solutions such as sodium carbonate, sodium bicarbonate, and the like.

The greater the volume of liquid passing through the confined space and over the packing, up to the point of flooding the combined space, the greater the effectiveness of the absorption. A factor limiting the volume of liquid flowing through the confined space is the back pressure on the gas as the fluid reduces the interstitial space free to pass the gases. Reasonable pressure drops for commercial operations is of the order of about 10 inches to about 30 inches of water although pressures outside this range can be utilized. For example, a sawdust bed 10 feet square and 7 inches thick will filter sulfur trioxide mist from 7000 c.f.m. of gas if a pressure drop of 19 inches of water is maintained; whereas, it will only filter about 5500 c.f.m of gas if the back pressure is increased to 25 inches of water.

Reference has been made above to the recovery of chemical mists such as are found in the manufacture of sulfuric acid. The method is equally applicable to chemical mists formed in concentrating chemicals such as submerged combustion evaporation of sulfuric acid and phosphoric acid, as well as more conventional concentration of zinc chloride, sulfuric acid, and the like.

The invention will be further understood by reference to the following examples which are given by way of explanation and without any intention that the invention be limited thereto.

*Example I*

In contact method of making sulfuric acid, sulfur was atomized and burned in the furnace to form sulfur dioxide. The gases at a temperature of about 760° C. were passed through a quartz packed filter to remove entrained solids. The hot gases were cooled by heat exchange in a steam generator and passed through a converter to oxidize the sulfur dioxide gas to sulfur trioxide.

The product gases from the plant containing about 8% $SO_3$ mist exhausted by a Schutte and Koerting jet where the gases were driven downward by a spray of water, the water being 80 pounds per square inch pressure. The water was accumulated in and withdrawn from a 50 gallon drum. The mist and water-wetted gases escaped from the top of the first drum and passed downward through a second 50 gallon drum having a filter bed therein supported by a 4 mesh screen. This filter bed was made up to be 12 inches deep with 3 layers of sawdust of varying particle size. The first layer adjacent the retainer screen was 9 pounds of —10 +80 mesh size particles. On top of this layer was applied 9 pounds of —30 +60 mesh size particles. The third and top layer consisted of 18 pounds of —60 +80 mesh size particles.

With the gas exhausted at ground level with a pressure drop across the sawdust bed of 10 inches of water, this bed filtered out $SO_3$ mist from the gas at a rate of 28.3 cubic feet of gas per minute per square foot of bed area. Sulfur trioxide was not detectable in the exhausted gases even though this pungent gas is detectable when present in quantities of about 3 parts per million.

*Example II*

The product gases containing $SO_3$ mist from the plant for manufacture of sulfuric acid discussed in Example I were exhausted from an absorption tower during a starting period and passed through the same drum arrangement as explained in Example I, except that the 7 inch thick wetted bed consisted of carbon coke of a particle size in the range of about 20 mesh to about 60 mesh standard screen size. The gas rate was 3500 cubic feet per minute and the pressure drop across the bed was approximately 10 inches of water.

Gases discharged into the air at ground level contained no detectable sulfur trioxide.

*Example III*

A mixture of air and $P_2O_5$ gas saturated with water vapor was passed through a filter bed 7 inches deep and made up of —20 +40 mesh size particles of flower of coke. The gases contained 0.27 grain $P_2O_5$ mist per cubic foot. At a water rate of approximately 0.45 gallon of water per 1.0 cubic foot of gas being treated and with a bed surface area of approximately 3 square inches, this bed removed all $P_2O_5$ from the gas.

*Example IV*

A mixture of air saturated with water plus volatile halides and aluminum chloride was passed through a 7 inch deep bed of —20 +40 mesh size flower of coke, the same as used in Example II. The gases contained 18.4 grains of halides per cubic foot. At a water rate of approximately 0.48 gallon of water per one cubic foot of gas being treated and with a bed surface area of approximately 3 square inches, this bed removed from the gas all the halide material. The exhaust gases contained no evidence of chloride.

*Example V*

In the manufacture of sulfuric acid the waste gases from the plant were exhausted by a Schutte and Koerting jet. The jet water was accumulated and was drawn from a 50 gallon drum. The hydrated or water wetted gases forming mist escaped from the top of the drum and passed downward through a second 50 gallon drum having a filter bed therein supported by a 4 mesh screen. In Example I the filter bed was made up to be 12 inches deep with sawdust particles. For this sawdust filter bed was substituted a layer of Orlon cloth which had a Frazier air porosity of 45 cubic feet maximum and 35 cubic feet minimum. With a pressure drop across the Orlon cloth packing of 19 inches of water, this Orlon cloth bed filtered out $SO_3$ mist from the gas at a rate of 17.1 cubic feet of gas per minute of square foot of bed area. This bed like the sawdust bed of Example I eliminated any public nuisance in the first of the ground level exhaust from the second or packed drum.

Having thus described our invention, what we claim is:

1. A method for the elimination of sulfur trioxide mist from gases which comprises passing a gas stream containing sulfur trioxide mist through a confined space packed with material inert with respect to said gas stream and sulfur trioxide mist and having a particle size distributed through a substantial range of particle sizes included in the range between about 10 mesh and about 80 mesh standard screen size, while also flowing a liquid having absorptive power for sulfur trioxide through said confined space in such volume as to maintain a back pressure on the gas stream in the range between about 10 inches and about 30 inches of water, and separately removing from said confined space a gas stream free from sulfur trioxide mist and a sulfur trioxide enriched liquid.

2. A method as in claim 1 wherein said inert material is coke.

3. A method as in claim 1 wherein said liquid is water.

4. A method as in claim 1 wherein said gas stream is contacted with a water spray before entering said confined space.

5. A method for the elimination of sulfur trioxide mists from gases which comprises passing a gas stream containing sulfur trioxide mist through a confined space packed with material inert with respect to said gas stream and sulfur trioxide mist and having particle sizes distributed throughout —10 +80 mesh standard screen size range in one portion of the packed material, particle sizes distributed throughout —30 to +60 mesh standard screen size range in another portion of the packed material, and particle sizes distributed throughout —60 to +80 mesh standard screen size range in a third and remainder portion of the packed material, while also flowing a liquid having absorptive power for sulfur trioxide through said confined space in such volume as to maintain a back pressure on the gas stream in the range between about 10" and about 30" of water and separately removing from said confined space a gas stream free from sulfur trioxide mist and a sulfur trioxide-enriched liquid.

6. A process as in claim 5 wherein the material inert with respect to said gas stream and sulfur trioxide mist is sawdust.

References Cited in the file of this patent

UNITED STATES PATENTS

| | | |
|---|---|---|
| 848,631 | Cellarius | Apr. 2, 1907 |
| 1,212,199 | Eustis | Jan. 16, 1917 |
| 2,227,164 | Stedman | Dec. 31, 1940 |
| 2,290,162 | Bragg | July 21, 1942 |
| 2,615,832 | Dixon | Oct. 28, 1952 |

OTHER REFERENCES

"Chemical Engineer's Handbook" by John H. Perry, 3rd edition, page 1029.